United States Patent [19]

Lewis

[11] E Patent Number: Re. 33,115

[45] Reissued Date of Patent: Nov. 21, 1989

[54] ACCOUCHEMENT APPARATUS

[76] Inventor: Julie M. Lewis, 18050 S. Skylands Cir., Lake Oswego, Oreg. 97034

[21] Appl. No.: 232,461

[22] Filed: Aug. 1, 1988

Related U.S. Patent Documents

Reissue of:

[64] Patent No.: 4,715,592
Issued: Dec. 29, 1987
Appl. No.: 910,802
Filed: Sep. 22, 1986

U.S. Applications:

[63] Continuation of Ser. No. 806,124, Dec. 6, 1985, abandoned, which is a continuation of Ser. No. 612,321, May 21, 1984, abandoned.

[51] Int. Cl.[4] ..... A61G 13/00

[52] U.S. Cl. ..... 269/328

[58] Field of Search ..... 269/328, 322, 901; 108/115; 5/507, 508, 431, 443, 433

[56] References Cited

U.S. PATENT DOCUMENTS

| | | | |
|---|---|---|---|
| 998,996 | 7/1911 | Swenson et al. | 5/433 |
| 2,732,269 | 1/1956 | Astroff | 269/328 |
| 2,819,133 | 1/1958 | Party | 269/328 |
| 3,817,512 | 6/1974 | Torrey | 269/328 |
| 3,880,417 | 4/1975 | Burris et al. | 269/328 |
| 4,362,295 | 12/1982 | Ford | 269/901 |
| 4,391,438 | 7/1983 | Heffington | 269/328 |
| 4,418,900 | 12/1983 | Ricke | 269/901 |
| 4,444,381 | 4/1984 | Wayne | 269/328 |

FOREIGN PATENT DOCUMENTS

| | | | |
|---|---|---|---|
| 1377482 | 9/1963 | France | 5/433 |

*Primary Examiner*—Robert C. Watson
*Attorney, Agent, or Firm*—Olson & Olson

[57] ABSTRACT

A labor support apparatus comprises an essentially U-shaped crossbar assembly mounted on a base member which is arranged to support the intermediate portion of the assembly above a floor or above the surface of a delivery bed. The cross bar assembly is configured to extend upwardly relative to the floor or bed surface, and includes a cushioning pad arranged to comfortably support a person in various positions during childbirth for the purpose of facilitating the birthing process.

6 Claims, 2 Drawing Sheets

ACCOUCHEMENT APPARATUS

Matter enclosed in heavy brackets [ ] appears in the original patent but forms no part of this reissue specification; matter printed in italics indicates the additions made by reissue.

This application is a continuation, of application Ser. No. 806,124, filed Dec. 6, 1985, now abandoned, which is a continuation, of application Ser. No. 612,321, filed May 21, 1984 now abandoned.

BACKGROUND OF THE INVENTION

This invention relates to accouchement devices, and more particularly to a support apparatus which is arranged to help support a women in various non-reclining positions during childbirth for the purpose of easing the pain of labor and facilitating the process of labor and delivery.

Such devices are known in the art, and I am aware of two U.S. Patents which are illustrative of the art. These are U.S. Pat. Nos. 136,663 and 597,473. Both patents disclose chair type apparatus constructed for the purpose of supporting a woman seated thereon during childbirth.

SUMMARY OF THE INVENTION

In its basic concept, this invention provides a labor support apparatus in which a padded horizontal bar is supported by legs arranged to help support a woman in a bed or on the floor in various position during labor and delivery.

It is by virtue of the foregoing basic concept that the principal objective of this invention is achieved: namely, the provision of a childbirth aid arranged to facilitate the process of labor and delivery for the woman.

Another object of this invention is the provision of a labor support apparatus of the class described which is adjustable to accommodate different women and their particular individual needs.

Another object of this invention is the provision of a labor support apparatus of the class described which supports a woman in positions which: allow for her relaxation during labor and delivery; may decrease pain; may decrease total labor time; help the perineum to stretch; facilitate internal rotation; relieve maternal vascular compression; allow the woman and baby to work together with gravity; and facilitate delivery.

Still another object of this invention is the provision of a labor support appratus of the class described which may be floor supported or attachable to a labor bed, as desired.

A further object of this invention is the provision of a labor support apparatus of the class described which may be easily collapsed for portability and storage.

A still further object of this invention is the provsion of a labor support apparatus of the class described which is of simplified construction for economical manufacture.

The foregoing and other objects and advantages of this invention will appear from the following detailed description, taken in connection with the accompanying drawings of preferred embodiments.

DESCRIPTION OF THE PREFERRED EMBODIMENT

Figure 2:
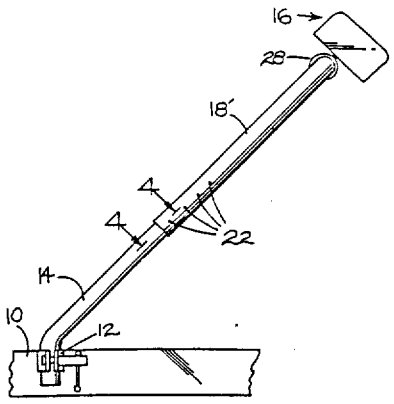
FIG. 2 is a fragmentary side view of the support apparatus of FIG. 1 as viewed from the left in FIG. 1.

The labor support apparatus embodied in the drawings is designed for removable mounting on a conventional hospital or birthing bed having opposite side frame members 10 to which are attached, as by welding, side socket 12. In accordance with this invention, these brackets are used conveniently to receive the lower end portion of a pair of upwardly extending tubular leg members 14 of the support apparatus. As best seen in FIG. 2, each leg member 14 is configured to extend angularly upward relative to the bed frame members 10 and hence the bed surface. This angular disposition is preferably, although not limited to, approximately 15 degrees from vertical for purposes which will appear in the operation of the apparatus.

A cross member is provided to connect the upper, projecting ends of the legs 14 together, and to provide mounting means for a cushion pad assembly illustrated generally at 16 against which a person may comfortably lean for support. In the embodiment illustrated in FIGS. 1–4, the cross member is configured as a U-shaped bar having an intermediate pad support section 18 and opposite end legs 18' the projecting ends of which engage the legs members 14 telescopically.

Means is also provided to adjustably secure the legs 18' in various positions of longitudinal extension relative to the legs 14, for the purpose of adjusting the vertical disposition of the section 18 and supported cushion pad 16 relative to the surface of the bed to which the assembly is mounted.

Figure 4:
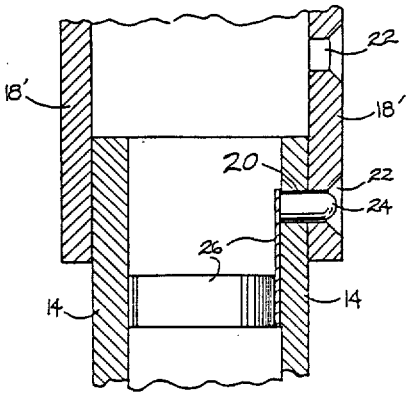
FIG. 4 is a fragmentary sectional view taken on the line 4—4 in FIG. 2 showing adjustment mechanism for varying the height of the support apparatus of this invention.

As best illustrated in FIG. 4, the adjustable securing means embodied herein comprises, in part, a bore 20 provided through the wall of each leg 14 adjacent its upper terminal end. A plurality of longitudinally spaced bores 22 are provided through the wall of each projecting leg 18' of the cross member. Each of said plurality of bores is arranged to the brought into selective registry with the bore 20 in the associated leg 14 when the cross member is adjusted slidably to various positions of extension on the uprights 14. In this embodiment, a locking pin 24 disposed within the confines of each upright 14 is arranged to extend through the bore 20 in leg 14 and into the bore 22 through the wall of the leg 18, thereby releasably securing the cross member in a desired position of longitudinal extension relative to the bed.

The locking pin 24 may be tensioned outwardly as illustrated, by virtue of its attachment to a leaf spring 26 which is attached to a resilient split ring 26' contained within the upper end of leg 14.

The cushioning pad assembly 16, described in detail in connection with FIG. 3, may be mounted on the closed end 18 of the U-shaped cross member by any suitable means such as by screws, bolts, or the like.

Figure 3:
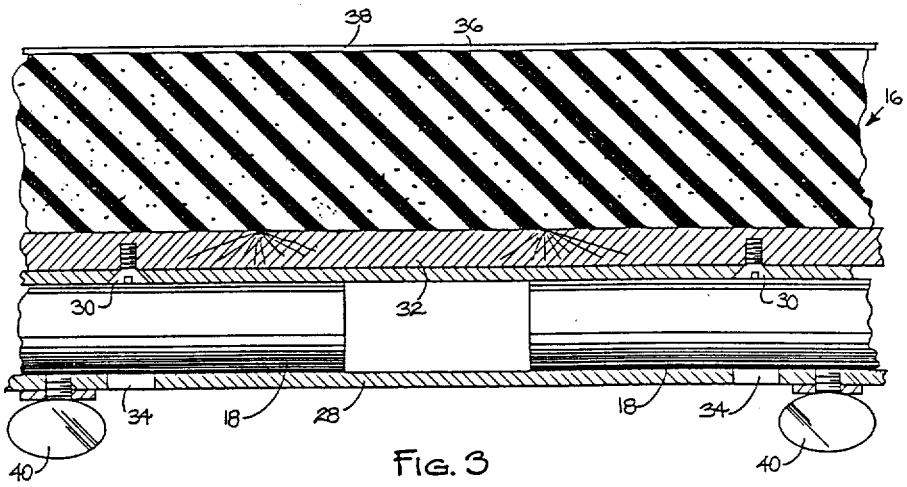
FIG. 3 is a fragmentary sectional view of the support apparatus of this invention having adjustment mechanism arranged for varying the width of the apparatus.

With reference now to FIG. 3 of the drawings, the U-shaped cross member is illustrated as having means by which the assembly may be adjusted laterally to accommodate its attachment to delivery beds of various width. In this embodiment, the cross member is provided in two symmetrical section each forming one leg 18' and a portion of intermediate section 18. Together they form the U-shaped cross member described earlier. The intermediate end portions 18 of the cross member are captured telescopically within a tubular support sleeve 28 which itself is anchored, as by screws 30, to the bottom of the base 32 of the cushion pad assembly 16. Openings 34 are provided through the wall of sleeve 28, as shown, to allow access to the screws 30 by a screwdriver or other tool to anchor the base 32 to the sleeve.

The cushion pad base 32 mounts, on its side opposite the sleeve 28, a cushion pad 36 of soft resilient material such as foam rubber, polyurethane, or the like. The support pad 36 and base 32 is covered with a suitable upholstery fabric 38.

Clamping means, illustrated herein as thumb screws 40, are threaded into nuts welded to the sleeve 28 intermediate the ends thereof. The thumb screws frictionally abut the outer surface of the cross member section 18' contained within the sleeve 28. In this manner, the sleeve 28 and the cushion pad assembly mounted thereto are firmly secured against movement rotationally and telescopically on the sections 18 when the assembly is set in a particular desired position.

FIGS. 5–8 illustrate another embodiment of the labor apparatus of the invention as a free standing version of the apparatus described hereinbefore. For simplicity, the cushion pad assembly 16, the cross member 18 and the adjustment means 20 to 26 may be similar in construction to that described in connection with FIGS. 1–4.

As seen best in FIGS. 5 and 6, a U-shaped base member 42 includes a rear portion arranged to the disposed on and supported by a floor surface and is configured to provide adequate stability against tipping during use, as will be described later. The forward positions 42' of the side legs of the base extend angularly upward and rearward, preferably at about 15 degrees from vertical, relative to the plane of the rear portion. The upper ends of these side legs 42' telescopically receive the legs 18' of the upper cross member.

A kneeling pad, the purpose of which will be described in the operation of this invention, is illustrated generally as pad 46, and may be provided for comfort. The pad, best illustrated in FIGS. 7 and 8, comprises a base 48 which rests on the floor surface that supports the apparatus base 42, and a resilient cushion pad 50 attached to the top of the base. An upholstery fabric 52 covers the cushion pad and base. Means may be provided, as illustrated for connecting the pad of the support apparatus if desired. The illustrated form of pad connecting means is a pair of elongated bars 54 anchored at their inner end to and extending laterally from opposite ends of the base 48 and having hook portions 56 at their outer ends for engaging the legs of base 42 of the apparatus. Any other suitable means, of course, may be utilized to connect the kneeling pad to the labor apparatus to prevent undesirable movement of the pad relative to the apparatus during its use.

Figure 9:
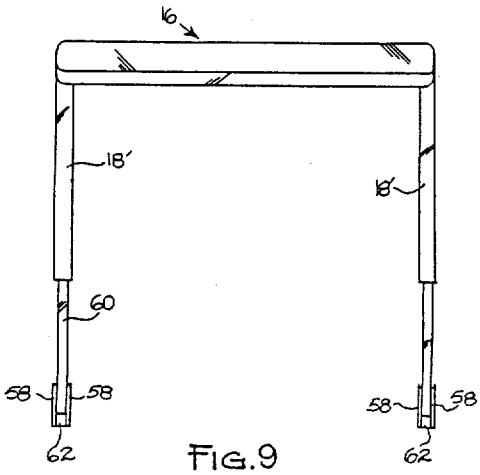
FIG. 9 is a front elevation of another embodiment of the labor support apparatus of this invention having collapsible base leg members for portability and ease of storage.
Figure 10:
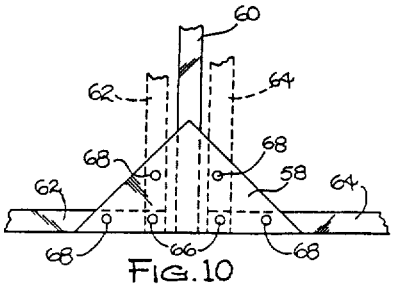
FIG. 10 is a fragmentary side elevation of the collapsible base leg mounting mechanism of the apparatus of FIG. 9 as seen from the right side in FIG. 9.

FIGS. 9 and 10 disclose yet another embodiment of this invention for use with labor beds of various widths and having particular emphasis on means for collapsing the apparatus for increased portability and ease of storage without requiring disassembly of the unit. The upper section, comprising parts 16 to 26, may be understood as being similar to those disclosed in connection with FIGS. 1–4.

In this embodiment, there is provided a pair of base mounting brackets 58 for each leg 60, illustrated herein as triangular in shape when viewed from the side as in FIG. 10. Each pair of brackets is secured to opposite lateral sides of a leg 60 (similar to leg 14), each of which connects with a leg 18' of the cross members, as described earlier in connection with FIGS. 1 and 2.

Each pair of base brackets 58 pivotally mounts a pair of projecting base leg members 62 and 64 axis by pivot pins 66. The leg members thus are pivotable between positions of longitudinal extension away for each other for bearing on a floor surface, as shown in full lines in FIG. 10, and a retracted position extending vertically upward on opposite sides of their associated leg 60, as shown in broken lines. The leg members thus support the apparatus against tipping on a floor surface when they are in extended position and are collapsible for convenient portability and storage.

Means is provided for releasably securing the leg members 62 and 64 in said operative, supporting position of extension from each other and in said retracted position. In this illustrated embodiment, the locking assemblies 68 the same as the locking pin assemblies 20–26 described in connection with the embodiment of FIGS. 1–4. It is to be understood, however, that any suitable means to releasably lock the leg members 62 and 64 into desired positions on the bracket 58 may alternatively be utilized. For example, this may include, among other, removable pins or bolts intercepting aligned bores arranged in appropriate positions through the brackets 58 and the legs 62 and 64.

With a bed frame mounting the base brackets 12 on its lateral side members 10, the operation of the labor support apparatus embodied in FIGS. 1–4 is as follows: Firstly, the thumb screws 40 are released from their frictional engagement with cross bar intermediate sections 18 to allow the latter to be telescopically adjusted so as to space the uprights 14 laterally to the proper widths for engaging the mounting brackets 12 on the sides of the bed. When appropriately aligned with the brackets, the apparatus is locked into the desired width by tightening the thumb screws again. The terminal ends of the uprights 14 are then simply slid into the tubular mounts 12 and the apparatus thereafter is adjusted for desired height of the cushioning pad 16 vertically relative to the bed. This is accomplished by simultaneously pressing the pins 24 inward while extending or retracting the crossbar legs 18'. This is repeated until the desired longitudinally spaced bores 22 align with the bores 20 and the pins 24, whereupon the outward tension of springs 26 force the pins 24 outward into locking reception in the desired bore 22 along the leg member 18'. The captured pins thus prevent further telescoping of the member 18 relative to the upright 14. When in the desired position, and the cushion paid is disposed at a selected vertical distance above the surface of the bed, the apparatus is ready for use.

As mentioned previously, in the embodiment illustrated in FIG. 3, means has been provided for rotating the cushion pad 16 on its mount to the cross member 18. Thus, if comfort requires a particular tilting of the cushioning pad 16 about the axis of the cross member, the thumb screws 40 can be loosened and the cushion pad assembly pivoted into a desired position, whereupon the thumb screws are again tightened.

With the apparatus thus securely mounted to the opposite side frame members of a bed and with the cross member and cushion pad extending laterally across the width of the bed a spaced distance thereabove, a woman kneeling or squatting on the bed may then lean forwardly against the cushion pad with her arms hanging over the pad for support. Thus, she assumes an upright kneeling or squatting position in which her upper body is partially supported by the apparatus. Any other position may be attained by a person on a bed using the apparatus described for steadying support during labor and delivery.

The operation of the floor-supported apparatus of this invention, as embodied in the FIGS. 4–8 of the drawings is as follows: Firstly, the base 42 is placed on a suitable floor surface, and the legs 18' of the cross member are vertically adjusted telescopically as described earlier in connection with FIG. 4, to adjust the height of the pad 16 relative to floor surface. The kneeling pad 46 is connected to the base 42 so as to position the former on the floor beneath the cushion pad 16, The apparatus is thus ready for use.

A woman may position herself in a kneeling, standing or squatting position on the pad 46, again with upper body resting against the cushion pad 16 and her arms overhanging the pad. In this manner, she may assume any assisted upright position.

Finally, the operation of the floor-supported apparatus of this invention, as embodied in FIGS. 9 and 10 of the drawings is as follows: With the apparatus in storage position with the base legs 62 and 64 retracted as shown in broken line in FIG. 10, the assembly is set on a floor surface and the legs 62 and 64 are pivoted downwardly about their respective pivots 66 until the locking assemblies 68 engage to secure the legs into their extended, supporting positions shown in full lines in FIG. 10. The width of the assembly may be adjusted, if so provided for, as in connection with FIG. 3 as described earlier, and the height of the cushion pad 16 may be adjusted as desired in the manner described in connection with FIG. 4.

Figure 1:
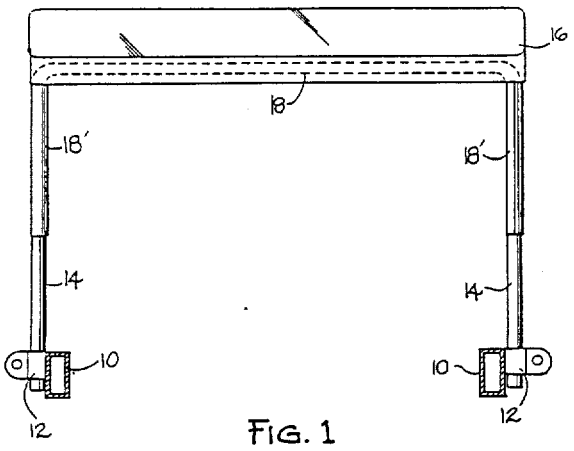
FIG. 1 is a front view of one embodiment of the support apparatus of this invention adapted for attachment to any bed used in labor and delivery.
Figure 5:
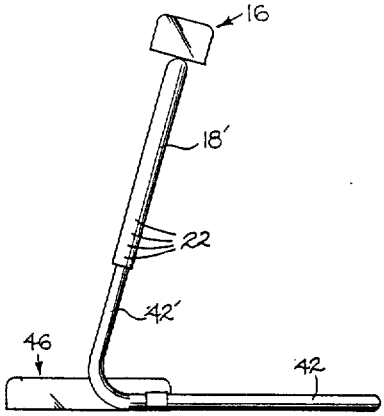
FIG. 5 is a side elevation of another embodiment of the labor support apparatus of this invention.
Figure 6:
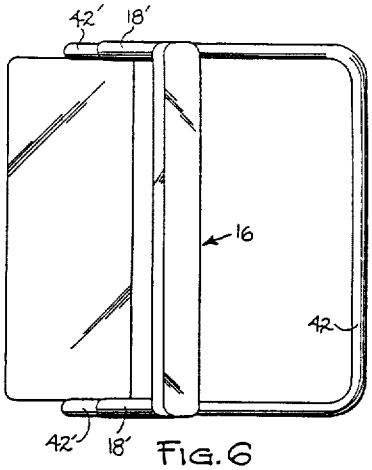
FIG. 6 is a top plan view of the labor support apparatus of FIG. 5.
Figure 7:
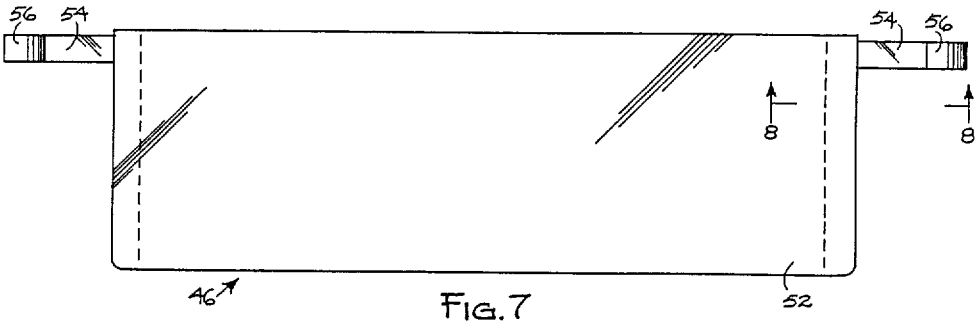
FIG. 7 is a plan view on an enlarged scale of the kneeling pad shown in FIG. 6.
Figure 8:
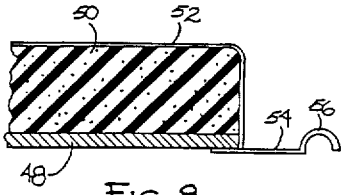
FIG. 8 is a fragmentary sectional view on an enlarged scale of a portion of the kneeling pad of FIG. 7, taken along the line 8—8 in FIG. 7.

This embodiment of the invention, aside from its increased portability and storage facility, finds particular versatility in accommodating use similar to that of FIGS. 5 and 6 as well as in connection with a bed as in FIGS. 1 and 2. Specifically, the apparatus may be used to support a person kneeling on the floor or on a kneeling pad just as described in connection with FIGS. 5 and 6, or the assembly may be adjusted for suitable width and height to straddle a bed for use by a person positioned on the bed as described earlier in connection with the operation of the device of FIGS. 1 and 2. When the device is no longer needed, the base legs 62 and 64 are then released from their extended supporting position, pivoted upwardly into retracted position, and the compact unit stored away until its next use.

From the foregoing it will be apparent to those skilled in the art that various changes, other than those already described, may be made in the size, shape, type, number and arrangement of parts described herein before without departing from the spirit of this invention and the various alternative manners in which it may be used. As an example, although particular adjusting means are illustrated herein for selectively altering the width and height of the various assemblies, any other suitable adjustment means may alternatively be utilized. Similarly, non-adjustable, fixed width and height assemblies may also be provided if desired for particular applications or for reducing manufacturing costs.

Also, although the particular base means illustrated and described throughout are preferred, other configurations which support the assembly in the upright positions described are contemplated. Any fixed based 42, pivotal base leg assembly 62 and 64, or base mounting bracket 12 configuration may alternatively be used to provide mounting means for supporting the uprights 14 or 42' in operative positions.

Having thus described my invention, and the manner in which it may be used, I claim:

1. Accouchement apparatus for disposition on an underlying horizontal support, the accouchement apparatus configured to engage and support the woman in an upright position on the underlying horizontal support during labor and delivery, the accouchement apparatus comprising:

(a) a U-shaped frame having an intermediate horizontal upper body support portion and laterally spaced vertically extending legs of sufficient length to position said horizontal upper body support portion above an underlying horizontal support a distance sufficient to support the vertical extending upper body of a woman kneeling or squatting on the underlying horizontal support with the arms of the woman hanging over said horizontal upper body support portion, the legs comprising two telescoping sections arranged for longitudinal adjustment for varying the elevation of the horizontal upper body support portion above an underlying horizontal support to accommodate use by women of different heights, (b) a resilient pad secured to the intermediate upper body support portion of the frame for engagement by the vertically extending upper body of a woman kneeling or squatting on the underlying horizontal support and leaning against the padded upper body support portion for support in an upright position during labor and delivery, (c) said intermediate portion of the frame comprising two separate lateral sections, an outer hollow sleeve member slidably and rotatably receives said two separate sections telescopically therein for varying the spacing between the legs, securing means on the outer sleeve member releasably engages the two separate sections and secures them releasably to the sleeve member, whereby the sleeve member may be secured to the two separate sections in selected positions of rotation of the sleeve member, and the pad is rigidly secured to the sleeve member for rotation therewith, and (d) means on the legs for engaging an underlying horizontal support to support the frame in vertically extending position with the resilient upper body support pad disposed substantially horizontally a spaced distance above the underlying horizontal support sufficient to engage and support the vertically extending upper body of a woman kneeling or squatting on the underlying horizontal support for the woman in upright position leaning against the padded upper body support portion during labor and delivery.

2. Accouchement apparatus for disposition on an underlying horizontal support, the accouchement apparatus configured to engage and support the vertically extending upper body of a woman kneeling or squatting on the underlying horizontal support, for supporting the woman in an upright position on the underlying horizontal support during labor and delivery, the accouchement apparatus comprising:

(a) a U-shaped frame having an intermediate horizontal upper body support portion and laterally spaced vertically extending legs of sufficient length to position said horizontal upper body support portion above an underlying horizontal support a distance sufficient to support the vertical extending upper body of a woman kneeling or squatting on the underlying horizontal support with the arms of the woman hanging over said horizontal upper body support portion, the legs comprising two telescoping sections arranged for longitudinal adjustment for varying the elevation of the horizontal upper body support portion above an underlying horizontal support to accommodate use by women of different heights, (b) a resilient pad secured to the intermediate upper body support portion of the frame for engagement by the vertically extending upper body of a woman kneeling or squatting on the underlying horizontal support and leaning against the padded upper body support portion for support in an upright position during labor and delivery, (c) means on the legs for engaging an underlying horizontal support to support the frame in vertically extending position with the resilient upper body support pad disposed substantially horizontally a spaced distance above the underlying horizontal support sufficient to engage and support the vertically extending upper body of a woman kneeling or squatting on the underlying horizontal support for the woman in upright position leaning against the padded upper body support portion during labor and delivery, said means on the legs for supporting the U-shaped frame in vertically extending position comprising a base member configured to engage an underlying horizontal support and supporting said legs for adjustable vertical extension therefrom.

3. The accouchement apparatus of claim 2 wherein said base member is connected pivotally to each vertically extending legs for movement between an operative position supporting the legs extending upwardly therefrom and a retracted position along side the leg, and locking means is associated with said base member and leg for releasably locking the base member in said operative position.

4. The accouchement apparatus of claim 3 wherein said base member and vertically extending legs are configured to straddle a bed for disposing the intermediate horizontal upper body support portion of the U-shaped frame and resilient pad a spaced distance above and extending laterally across the surface of the bed, the bed surface serving as an underlying horizontal support for a woman.

5. The apparatus of claim 2 including a kneeling pad arranged to engage said base member and be disposed on a floor surface vertically below said resilient pad.

*6. Accouchement apparatus for disposition on an underlying horizontal support, the accouchement apparatus configured to engage and support the vertically extending upper body of a woman kneeling or squatting on the underlying horizontal support, for supporting the woman in an upright position on the underlying horizontal support during labor and delivery, the accouchement apparatus comprising:*

*(a) a U-shaped frame having an intermediate horizontal upper body support portion and laterally spaced vertically extending legs of sufficient length to position said horizontal upper body support portion above an underlying horizontal support a distance sufficient to support the vertical extending upper body of a woman kneeling or squatting on the underlying horizontal support with the arms of the woman hanging over said horizontal upper body support portion,*

*(b) a resilient pad secured to the intermediate upper body support portion of the frame for engagement by the vertically extending upper body of a woman kneeling or squatting on the underlying horizontal support and leaning against the padded upper body support portion for support in an upright position during labor and delivery, and*

*(c) means on the legs for engaging an underlying horizontal support to support the frame in vertically extending position with the resilient upper body support pad disposed substantially horizontally a spaced distance above the underlying horizontal support sufficient to engage and support the vertically extending upper body of a woman kneeling or squatting on the underlying horizontal support for the woman in upright position leaning against the padded upper body support portion during labor and delivery.*

* * * * *